US009217841B2

(12) United States Patent
Fan et al.

(10) Patent No.: US 9,217,841 B2
(45) Date of Patent: Dec. 22, 2015

(54) COMPACT CAMERA MODULE WITH ZOOM AND AUTO-FOCUS ACTUATORS SHARING THE SAME ROTATING ANNULAR MAGNET WITH ALTERNATING THICK AND THIN POLES

(75) Inventors: Kin Ming Fan, Hong Kong (HK); Kwok Sing Cheng, Hong Kong (HK)

(73) Assignee: Hong Kong Applied Science & Technology Research Institute Company, Limited, Hong Kong (HK)

( * ) Notice: Subject to any disclaimer, the term of this patent is extended or adjusted under 35 U.S.C. 154(b) by 867 days.

(21) Appl. No.: 13/012,928

(22) Filed: Jan. 25, 2011

(65) Prior Publication Data

US 2012/0188435 A1 Jul. 26, 2012

(51) Int. Cl.
*H04N 5/225* (2006.01)
*G02B 7/02* (2006.01)
*G11B 7/09* (2006.01)
*G02B 7/10* (2006.01)
*G02B 13/00* (2006.01)
*H02K 41/035* (2006.01)
*G03B 3/10* (2006.01)
*G02B 15/177* (2006.01)

(52) U.S. Cl.
CPC .............. *G02B 7/102* (2013.01); *G02B 13/009* (2013.01); *G02B 13/0045* (2013.01); *G03B 3/10* (2013.01); *H02K 41/0356* (2013.01); *G02B 15/177* (2013.01); *G03B 2205/0046* (2013.01); *G03B 2205/0069* (2013.01)

(58) Field of Classification Search
CPC ........................... G02B 7/102; G02B 13/0045
USPC .............. 348/240.99, 240.1, 240.3, 360, 361, 348/374, 375; 369/44.21, 44.22; 359/699, 359/824
See application file for complete search history.

(56) References Cited

U.S. PATENT DOCUMENTS

| 6,567,352 | B1 | 5/2003 | Inui et al. |
| 6,657,795 | B2 | 12/2003 | Nishimura et al. |
| 7,064,912 | B2 | 6/2006 | Yamamoto et al. |
| 7,295,390 | B2 | 11/2007 | Miki |
| 2006/0114583 | A1* | 6/2006 | Miki ............................ 359/824 |

* cited by examiner

*Primary Examiner* — Twyler Haskins
*Assistant Examiner* — Carramah J Quiett
(74) *Attorney, Agent, or Firm* — gPatent LLC; Stuart T. Auvinen

(57) ABSTRACT

A compact camera modules has first, second, and third lens groups that move along an optical axis. A stepping motor is centered on the optical axis rather than offset from the optical axis. The motor has two coils that are fixed in place and a shared rotating magnet. The magnet is attached to a rotating guide that has slots to move the first and second lens groups as it rotates. The two coils are alternately energized to rotate the magnet, the rotating guide, and to move the first and second lens groups for zoom. The magnet has alternating thicker and thinner segments of opposite polarity. The thicker segments exert a greater force on an autofocus coil that is energized to move the third lens for the autofocus function. The same shared rotating magnet is used for both zoom and autofocus functions. A more compact design is possible using a shared magnet.

19 Claims, 17 Drawing Sheets

COMPACT CAMERA MODULE WITH ZOOM AND AUTO-FOCUS ACTUATORS SHARING THE SAME ROTATING ANNULAR MAGNET WITH ALTERNATING THICK AND THIN POLES

FIELD OF THE INVENTION

This invention relates to camera lens modules, and more particularly to lens modules with zoom and auto-focus sharing a same rotating magnet.

BACKGROUND OF THE INVENTION

Smaller, compact camera designs require compact lens modules. Functions such as zoom and autofocus are also desirable. The camera lenses are often assembled together in a module known as a compact camera module (CCM).

The size of the lens assembly can be reduced by using several smaller lenses rather than fewer large lenses. The lenses may be grouped together into groups of lenses that are moved together as a group relative to the other groups of lenses to achieve the zoom function.

The lens groups are moved along the optical axis to vary the zoom magnification. Typically a small step motor drives a screw rail mechanism to move a lens group for zoom or autofocus functions. The motor may instead drive a gear system that moves groups of lenses. Separate actuators and magnets may be used for the zoom and autofocus functions. The motors are often located at the side of the lenses, offset from the optical axis, but some may place the motors around the optical axis for a more compact design.

While useful, motors and gear or screw mechanisms are relatively bulky and thus increase the size of the compact camera module. A compact camera module is desired that locates the step motor around the optical axis. A compact camera module is desired that shares a magnet for the step motor with both the zoom function and the autofocus function.

DETAILED DESCRIPTION

The present invention relates to an improvement in compact camera lens modules. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the stepping motor may be centered on the optical axis rather than offset from the optical axis. The motor can have two coils and a shared magnet. The two coils are alternately energized to move the lens groups for zoom, while a third coil is energized to move a lens for the autofocus function. The same shared magnet is used for both zoom and autofocus functions. A more compact design is possible using a shared magnet.

The two coils are stationary while the shared magnet rotates. The optical axis is also the center of the coils and the center of the shared magnet. Thus the shared magnet rotates about the optical axis.

Figure 1:
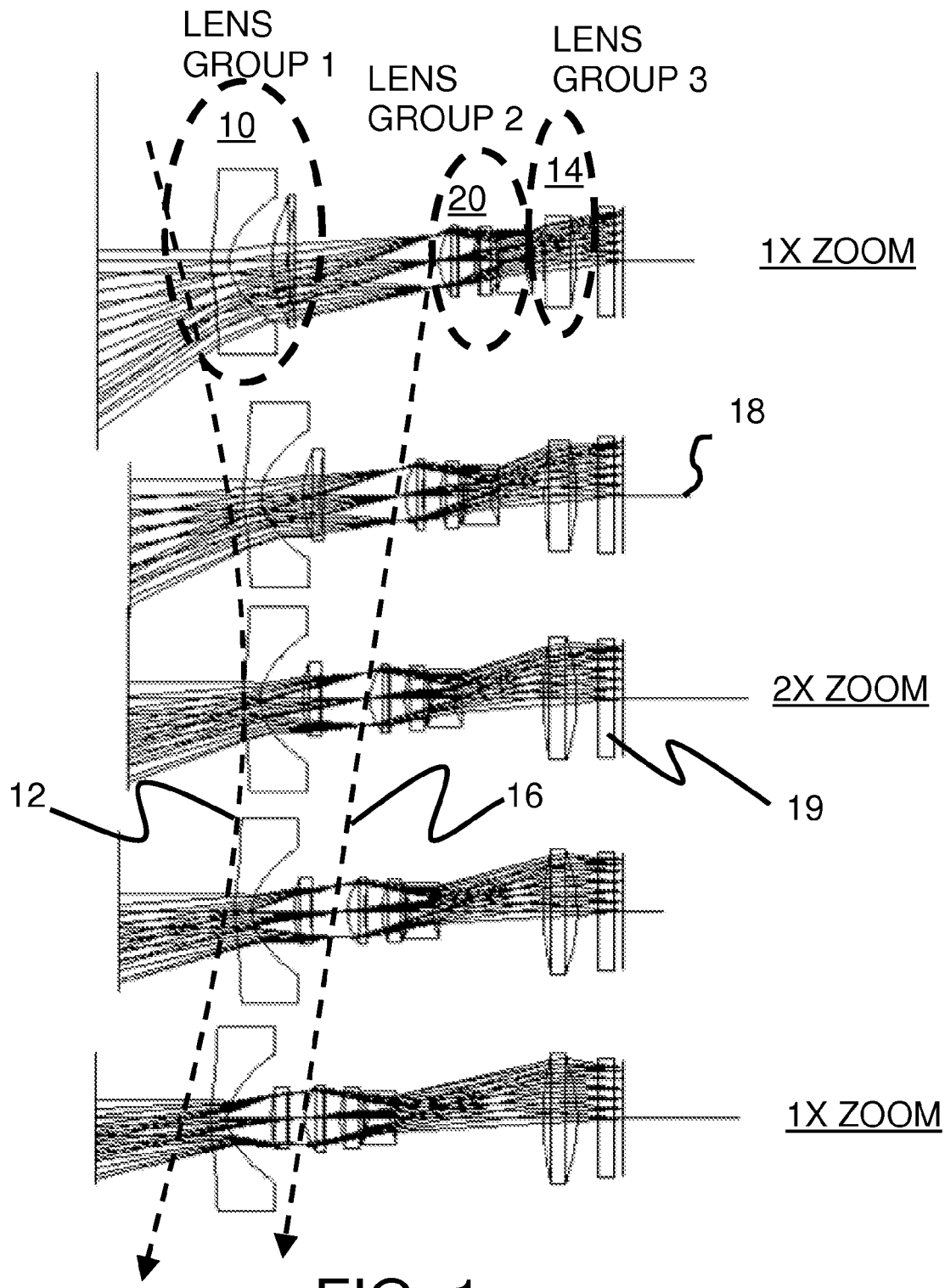
FIG. 1 shows an optical design of a compact camera module.

FIG. 1 shows an optical design of a compact camera module. The lenses are all centered about optical axis 18. The lenses are arranged into three groups of lenses. The lenses within a group remain fixed in position relative to other lenses within that same group, except for an autofocus lens that moves within its lens group to achieve autofocus.

The object being photographed or imaged is on the left of FIG. 1, while image sensor 19 is on the right. Image sensor 19 contains charge-coupled capacitors (CCD) or photo-diodes or complementary metal-oxide-semiconductor (CMOS) devices or other image sensing devices to convert the optical image to electronic signals that can be recorded by the digital camera.

First lens group 10 contains two lenses and is near the objective end of the module. Second lens group 20 contains three lenses. Third lens group 14 contains one lens, which is moved relative to image sensor 19 to focus the image onto image sensor 19 during the autofocus function. Other embodiments may have additional or fewer lenses in each group.

During zoom when the zoom magnification is changed, first lens group 10 moves along optical axis 18 by following path 12, while second lens group 20 also moves along optical axis 18 but follows path 16. When the zoom magnification changes from 1× to 2×, first lens group 10 moves inward along optical axis 18, closer to image sensor 19, while second lens group 20 moves outward along optical axis 18, farther from image sensor 19.

When the zoom magnification changes further from 2× to 3×, first lens group 10 reverses and moves outward along optical axis 18, farther from image sensor 19. Second lens group 20 continues to move outward along optical axis 18, farther from image sensor 19.

Thus second lens group 20 follows path 16, which is roughly linear and monotonically increasing. In contrast, first lens group 10 moves along a curved path 12, reversing its direction of movement mid-path.

Figure 2:
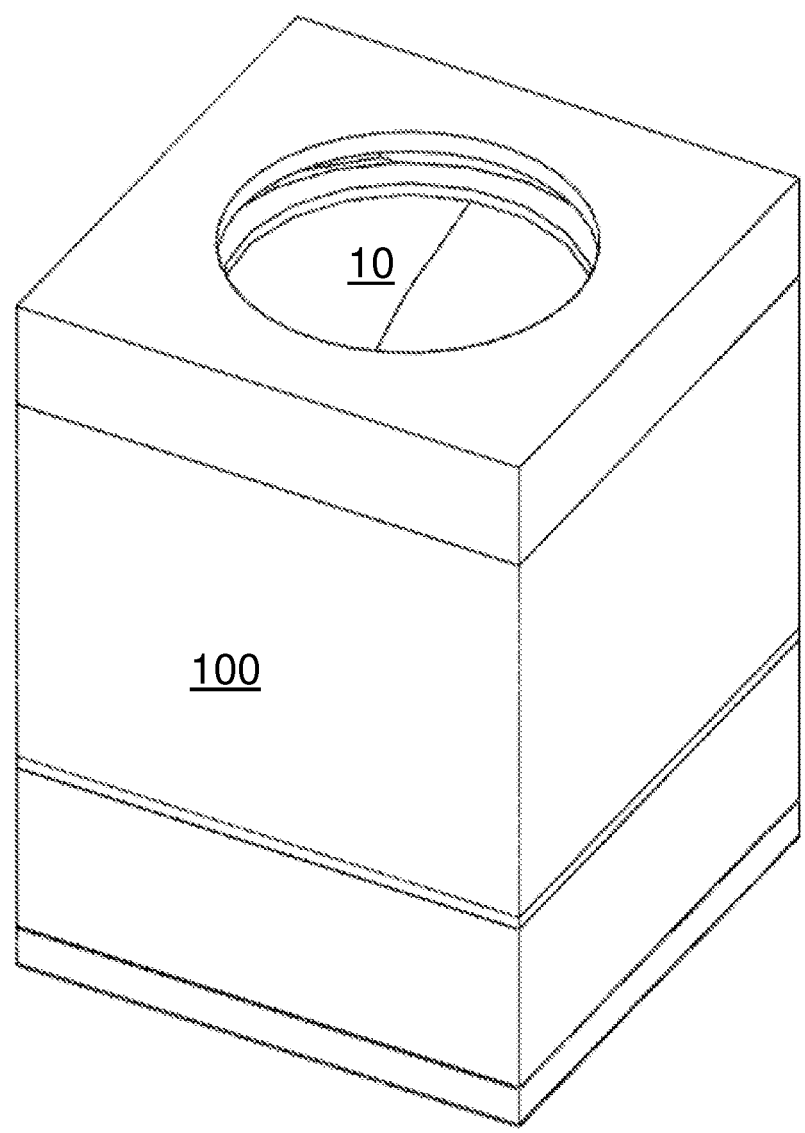
FIG. 2 is a view of a compact camera module.

FIG. 2 is a view of a compact camera module. Compact camera module 100 performs the 3× zoom function of FIG. 1 and also provides autofocus using a shared magnet. Only first lens group 10 is visible from the exterior of compact camera module 100. Compact camera module 100 can be assembled into a digital camera with first lens group 10 facing away from the digital camera, toward the object of the image, such as a person or a landscape.

In one embodiment, the size of compact camera module 100 is 12 mm×12 mm×19 mm, a volume of 2.74 cm$^3$. The focal length is 1.64 mm.

Figure 3A:
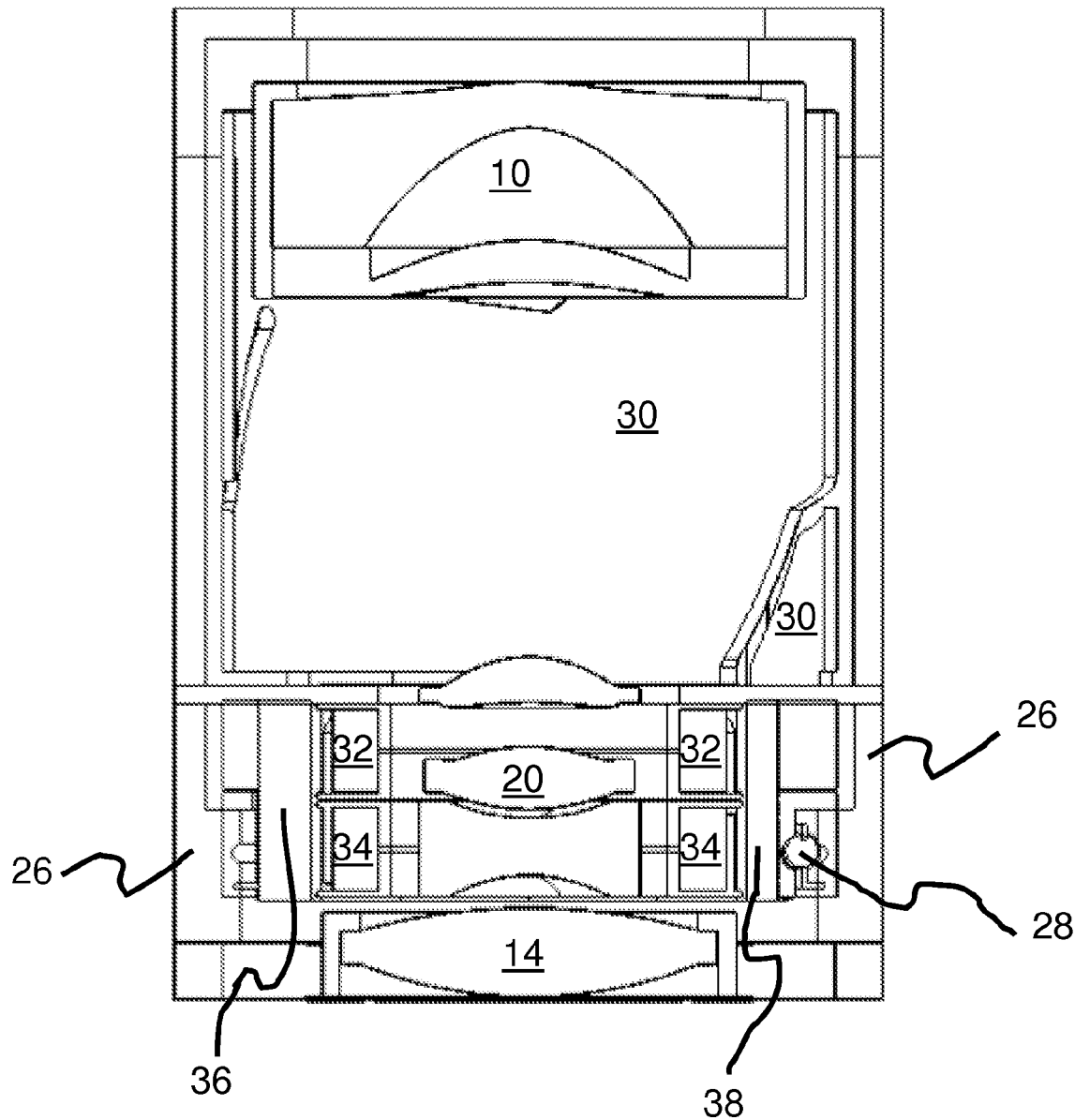
FIGS. 3A-B are cross-sectional views of the compact camera module in the 1× zoom position.
Figure 3B:
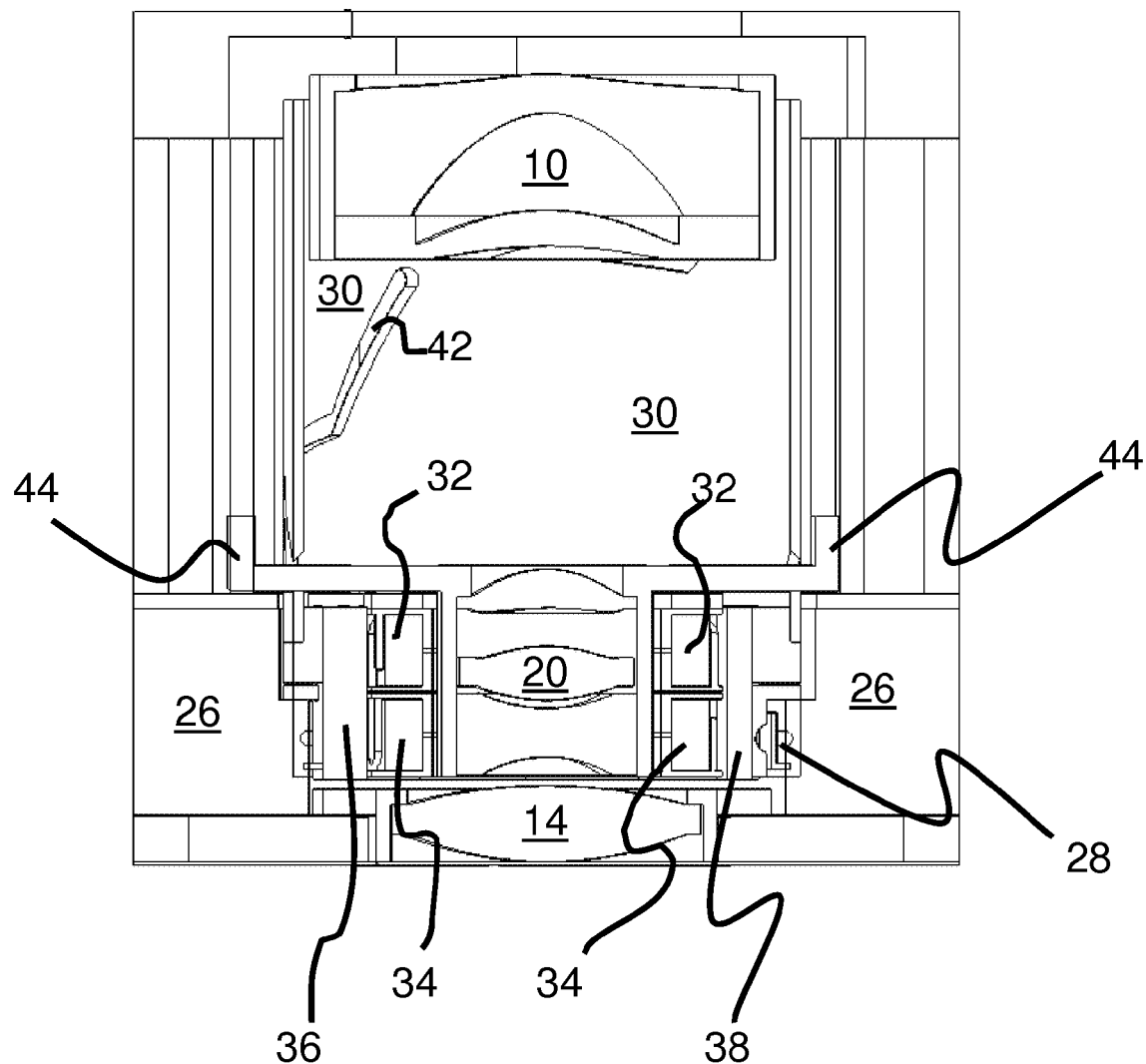

FIGS. 3A-B are cross-sectional views of the compact camera module in the 1× zoom position. First lens group 10 is neat the top (objective) end of the optical axis, which is a vertical line (not shown) running through the centers of first lens group 10, second lens group 20, and third lens group 14. For 1× zoom, second lens group 20 is fully retracted toward third lens group 14.

During the zoom function, as the zoom magnification changes, first lens group 10 moves down and up in response to rotation of rotating guide 30. Second lens group 20 also moves downward or upward along the optical axis as rotating guide 30 rotates. Rotating guide 30 is generally a hollow cylinder in shape that surrounds first lens group 10.

Slots 42 in rotating guide 30 receive arms (not shown) that are attached to first lens group 10, forcing first lens group 10 to move down and up along the optical axis as rotating guide 30 rotates around the optical axis. Another set of slots 42 in rotating guide 30 receive arms 44 (FIG. 3B) that are attached to second lens group 20, forcing second lens group 20 to move up along the optical axis as rotating guide 30 rotates around the optical axis. Thus rotating guide 30 forces movement of first lens group 10 and second lens group 20 up and down along the optical axis as rotating guide 30 is rotated.

Rotating guide 30 is attached to rotating shared magnet that is annular in shape and surrounds the optical axis. As the rotating shared magnet turns, rotating guide 30 is rotated. The rotating shared magnet is part of a stepping motor. The rotating magnet is shown in more detail in FIG. 6, but thicker magnet segments 36 and thinner magnet segments 38 of the rotating shared magnet are visible in the cross-sections.

The rotating shared magnet that includes thicker magnet segments 36 and thinner magnet segments 38 forms an annular ring magnet that rotates out of the plane of the cross-sectional FIGS. 3-4, also causing rotating guide 30 to rotate out of the plane of FIGS. 3-4. The center of rotation is the optical axis through the centers of first lens group 10, second lens group 20, and third lens group 14.

Ball bearings 28 allow the rotating shared magnet of thicker magnet segments 36 and thinner magnet segments 38 to rotated within support 26. Upper stationary coil 32 and lower stationary coil 34 are also annular rings that are concentric with the rotating shared magnet. However, upper stationary coil 32 and lower stationary coil 34 are fixed to support 26 and do not rotate or move.

Stationary coil 32, 34 and the rotating shared magnet (thicker magnet segments 36 and thinner magnet segments 38) together form a stepping motor that rotates rotating guide 30. The rotating shared magnet (thicker magnet segments 36 and thinner magnet segments 38) act as a rotating shared magnetic field generator, while rotating guide 30 acts as part of a linkage to first lens group 10, transferring the rotation of the rotating shared magnet to a linear movement of first lens group 10 along the optical axis. Rotating guide 30 may also act as part of a second linkage to second lens group 20, transferring the rotation of the rotating shared magnet to a linear movement of second lens group 20 along the optical axis. Second lens group 20 is also an intermediate lens group between lens groups 10, 14.

Figure 4A:
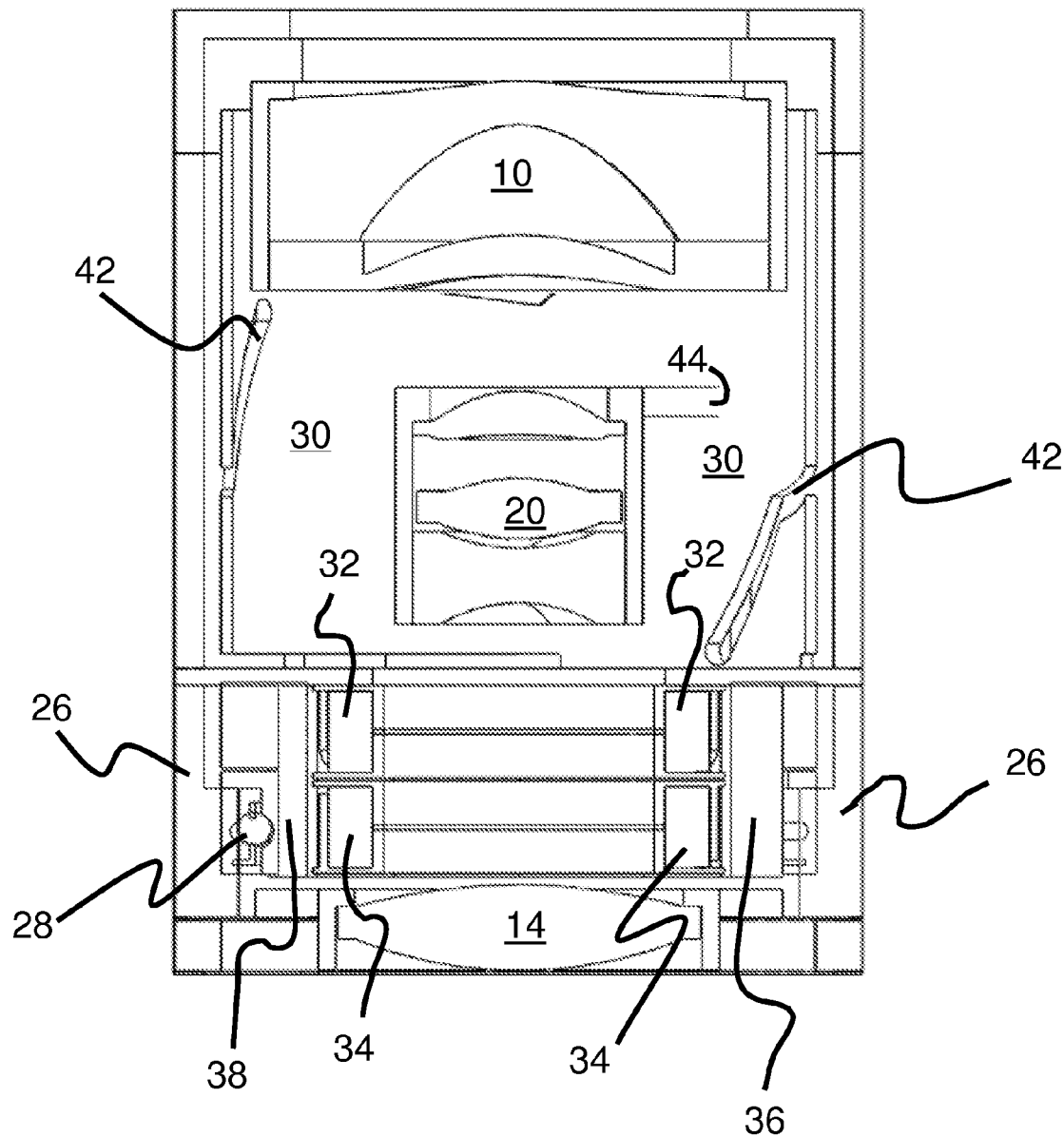
FIGS. 4A-B are cross-sectional views of the compact camera module in the 2× zoom position.
Figure 4B:
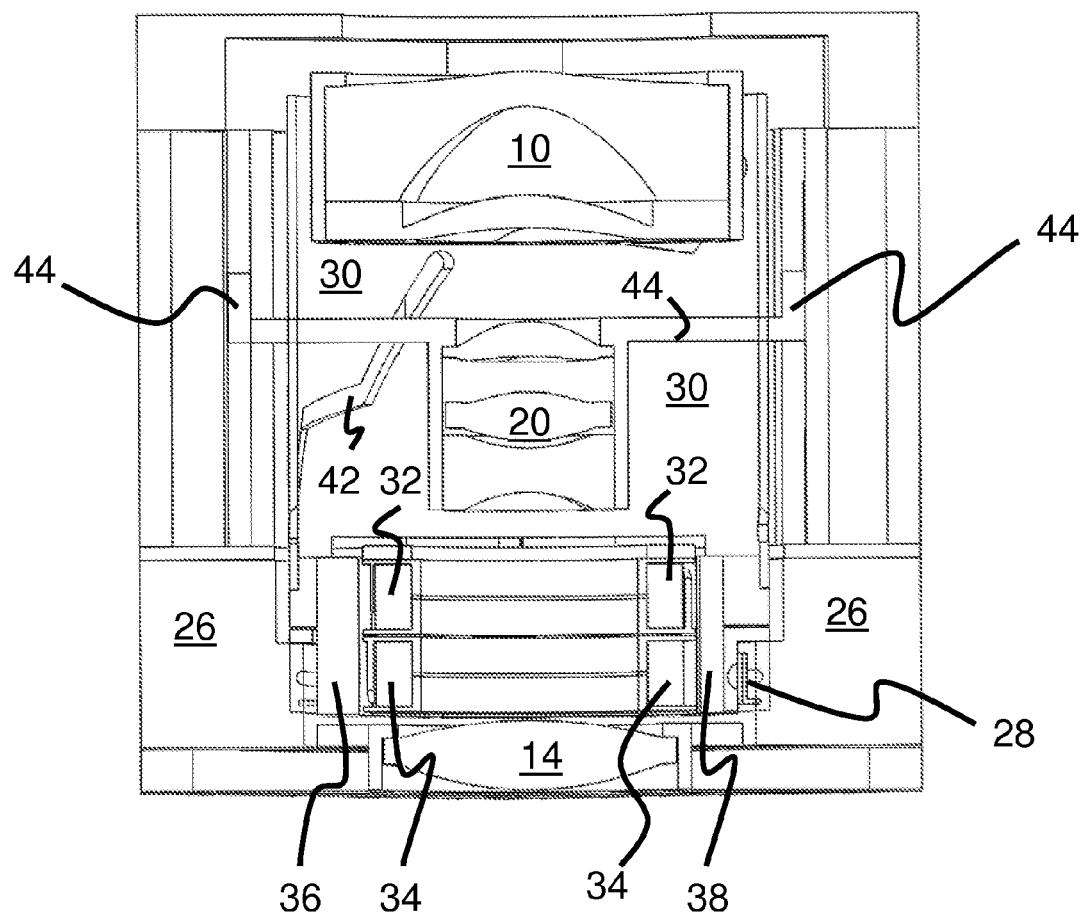

FIGS. 4A-B are cross-sectional views of the compact camera module in the 2× zoom position. In FIGS. 4A-B, upper stationary coil 32 and lower stationary coil 34 have been alternately energized to rotate the rotating shared magnet by applying alternating magnetic forces upon thicker magnet segments 36 and thinner magnet segments 38. The result of this activity is that both the rotating shared magnet and rotating guide 30 attached to the rotating shared magnet have rotated relative to their positions in FIGS. 3A-B.

Slots 42 in rotating guide 30 receive arms 44 that are attached to second lens group 20. As the rotating shared magnet and rotating guide 30 rotated together, slots 42 in rotating guide 30 forced arms 44 upward, pulling second lens group 20 upward along the optical axis. Thus rotating guide 30 forced movement of second lens group 20 up along the optical axis as rotating guide 30 was rotated between the views of FIG. 3 and FIG. 4. The zoom magnification has increased by moving second lens group 20 upward. Some movement up or down of first lens group 10 may have occurred in a similar manner.

Upper stationary coil 32 and lower stationary coil 34 remain fixed in position by support 26. Thicker magnet segments 36 and thinner magnet segments 38 of the rotating shared magnet remain near coils 32, 34 after rotation.

Figure 5:
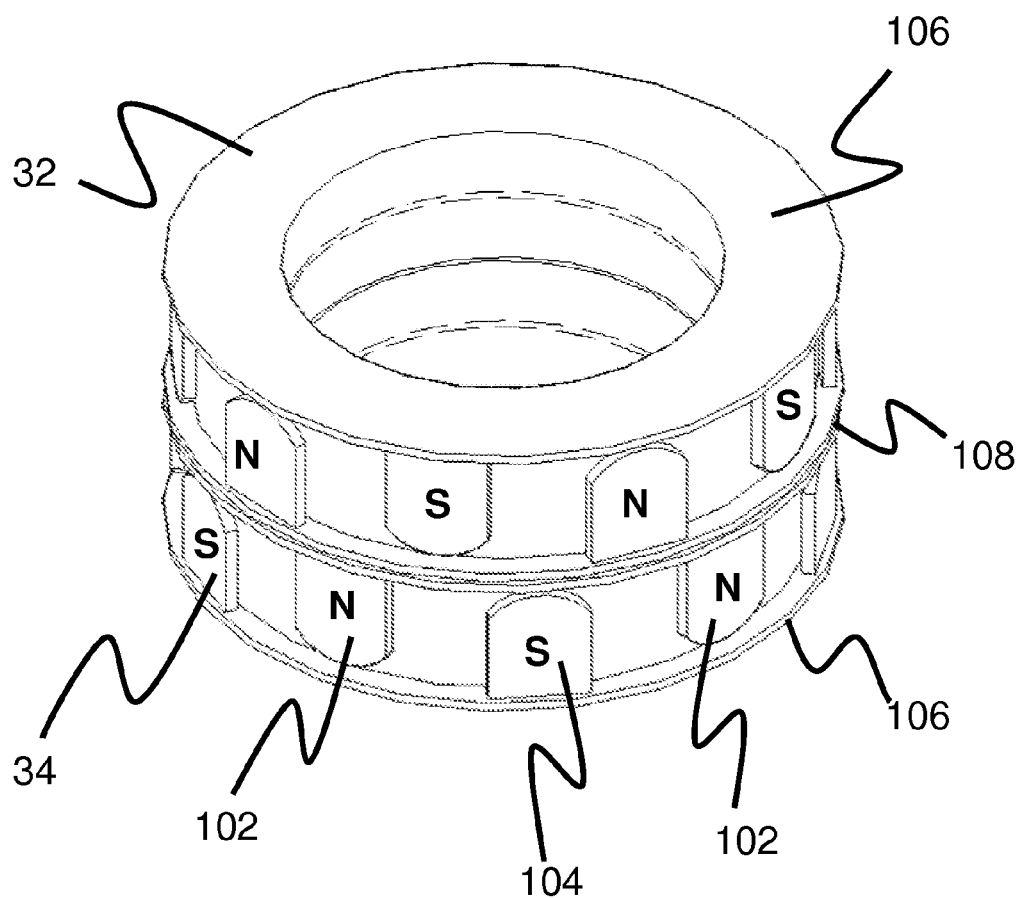
FIG. 5 show the upper and lower stationary coils in more detail.

FIG. 5 show the upper and lower stationary coils in more detail. Upper stationary coil 32 and lower stationary coil 34 are fixed in position by support 26 (not shown).

Upper stationary coil 32 includes south yoke 106 and north yoke 108, with metal wire windings between yokes 106, 108. The wire windings form a coil that can be energized by electric current. South yoke 106 is made from metal and has extensions that are bent or otherwise formed to provide south teeth 104. Likewise, north yoke 108 is also made from metal and has north teeth 102 on the outer edge. North teeth 102 and south teeth 104 are evenly distributed and alternate around the outer circumference of upper stationary coil 32 and lower stationary coil 34.

South yoke 106 and north yoke 108 are reversed in orientation for lower stationary coil 34. When electric current is passed through upper stationary coil 32, the coil is energized and a magnetic field is created. The magnetic field is conducted by yokes 106, 108 to teeth 102, 104 and north magnetic polarities are induced on north teeth 102, while south magnetic polarities are induced on south teeth 104.

Teeth 102, 104 are offset from each other on upper stationary coil 32 relative to those on lower stationary coil 34, so that segments of the rotating shared magnet alternately encounter north and south teeth. When coils 32, 34 are alternately energized, the rotating shared magnet is stepped in rotation from one tooth to the next tooth. Standard control circuits for micro stepping motors can be used to generate electrical signal to apply to coils 32, 34 to provide the amount of rotation desired. Upper stationary coil 32 and lower stationary coil 34 act as a stationary magnetic field generator that interact with the rotating shared magnet to induce an electromagnetic force to rotate the rotating shared magnet.

Figure 6:
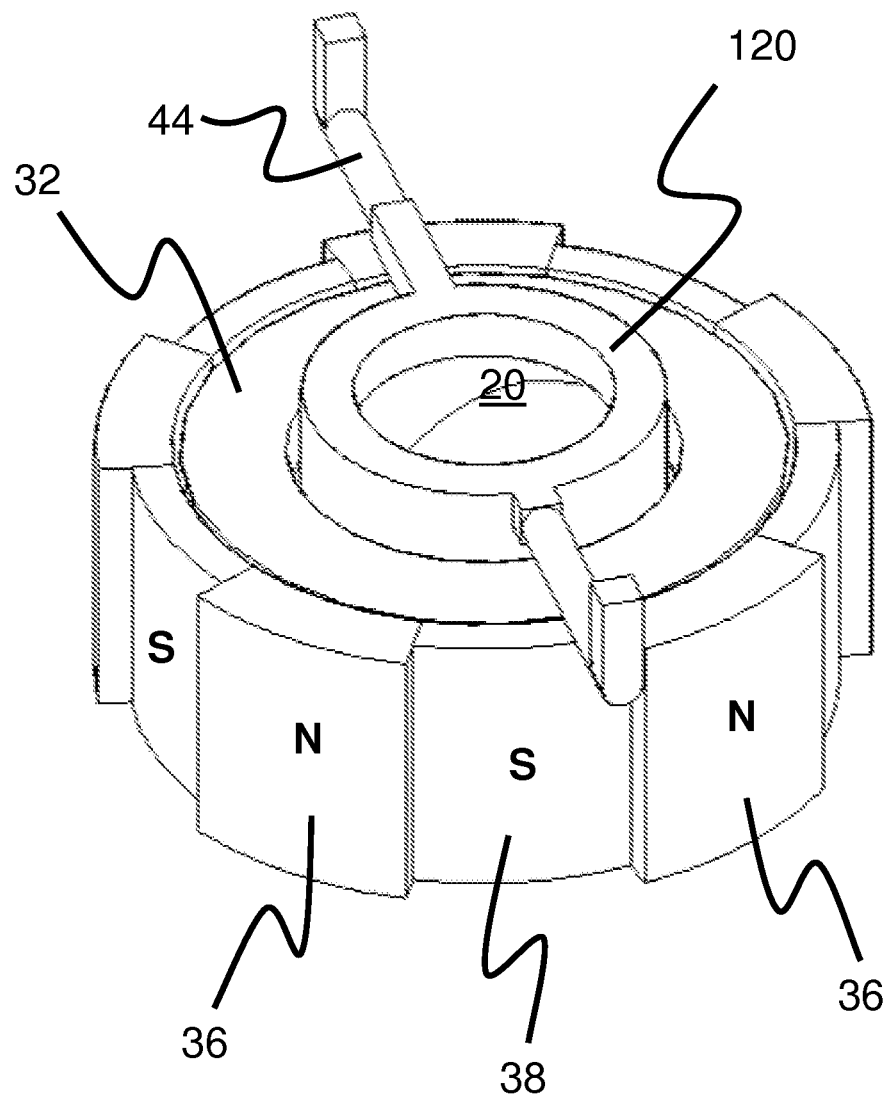
FIG. 6 shows the rotating shared magnet in more detail.
Figure 7:
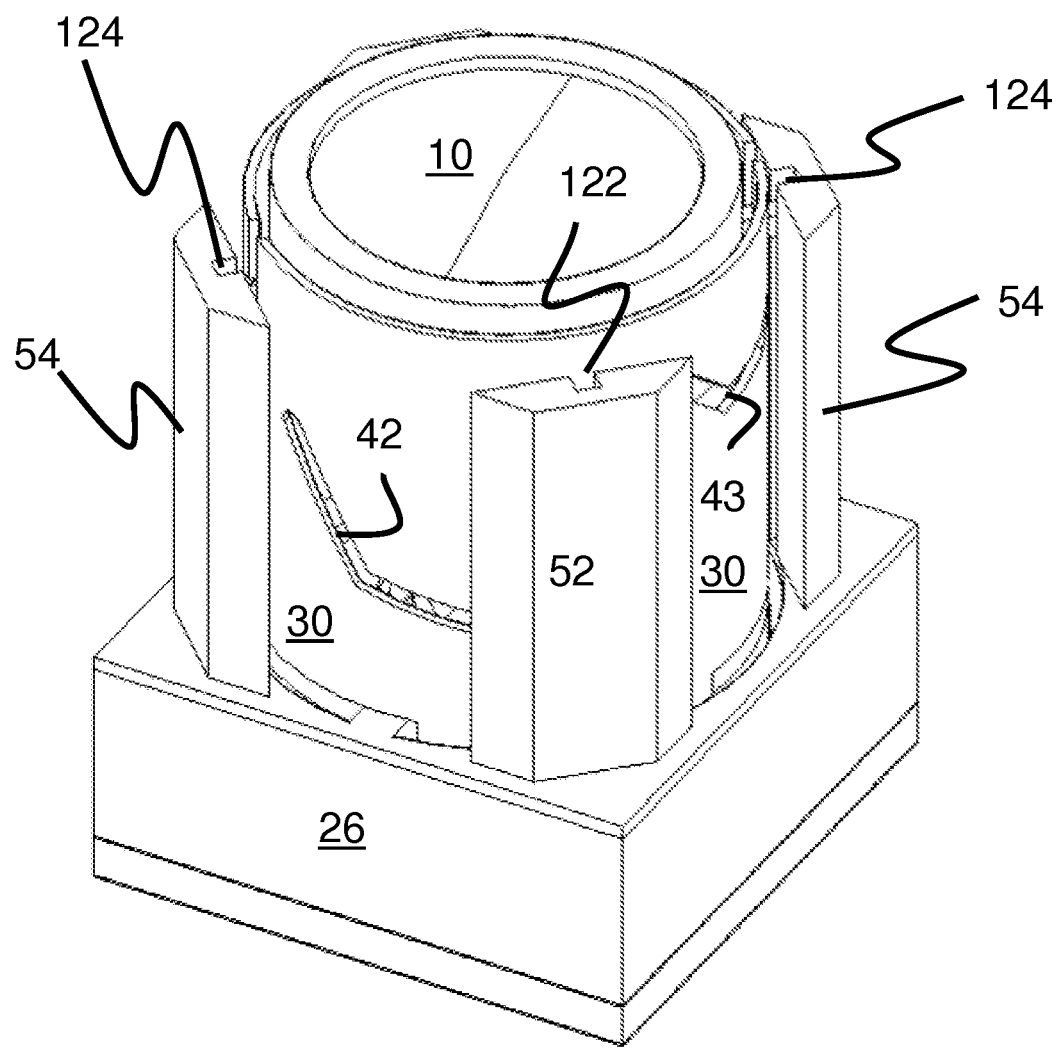
FIG. 7 shows the rotating guide in more detail.

FIG. 6 shows the rotating shared magnet in more detail. Rotating shared magnet 40 is a ring that includes thicker magnet segments 36 and thinner magnet segments 38 that alternate around the circumference of the ring. Upper stationary coil 32 is inside rotating shared magnet 40, and second lens group 20 is shown inside upper stationary coil 32. However, second lens group 20 moves up along the optical axis when arms 44 are pulled upward by slots in rotating guide 30 (FIG. 7). Arms 44 are attached to or extensions of lens supporter 120 which holds the individual lenses within second lens group 20 in position relative to each other.

Second lens group 20 is not attached to upper stationary coil 32. Upper stationary coil 32 is fixed in position to support 26 (not shown). However, rotating shared magnet 40 (thicker magnet segments 36 and thinner magnet segments 38) is not attached to upper stationary coil 32 and rotates freely around upper stationary coil 32.

Rotating shared magnet 40 is formed from thicker magnet segments 36 and thinner magnet segments 38 that alternate around the ring. The magnetic polarities of all thicker magnet segments 36 are north, while the magnetic polarities of all thinner magnet segments 38 are south.

Thicker magnet segments 36 exert a greater magnetic force than do thinner magnet segments 38. When upper stationary coil 32 is energized, the north and south magnet segments 36, 38 line up with their corresponding opposite magnetic polarities of teeth 102, 104 of upper stationary coil 32 (FIG. 5). This magnetic force causes rotating shared magnet 40 to rotate slightly to achieve a better magnetic alignment. The operation is similar to that of a stepping motor.

FIG. 7 shows the rotating guide in more detail. The rotating shared magnet (not visible) rotates freely within an annular cavity inside support 26. The rotating shared magnet is attached to the bottom of rotating guide 30 inside support 26. As the rotating shared magnet rotates, rotating guide 30 is also rotated.

First guides 54 are fixed to support 26 and contain first grooves 124 that fit over first arms (similar to 44 of FIG. 6, but attached to first lens group 10). Thus the first arms attached to first lens group 10 are forced to move up and down first grooves 124 as rotating guide 30 rotates.

Second guides 52 are fixed to support 26 and contain second grooves 122 that fit over arms 44 attached to second lens group 20. Thus arms 44 attached to second lens group 20 are forced to move up and down second grooves 122 as rotating guide 30 rotates.

First lens group 10 is supported by first arms that fit into upper slots 43 in rotating guide 30. Second lens group 20 (not visible) inside rotating guide 30 also has arms that fit into lower slots 42 in rotating guide 30. However, the shapes of upper slots 43 and lower slots 42 differ.

Upper slots 43 dip down and then back up he sides of rotating guide 30, while lower slots 42 fall down the sides of rotating guide 30 without rising back up. The lowest location of upper slots 43 on rotating guide 30 corresponds to the minimum on path 12 of first lens group 10 shown in FIG. 1, which occurs near a 2× zoom. The shape of upper slots 43 causes first lens group 10 to trace path 12 as rotating guide 30 rotates, while the shape of lower slots 42 causes second lens group 20 to trace path 16 as rotating guide 30 rotates. The lens group movement of FIG. 1 is thus achieved.

Figure 8:
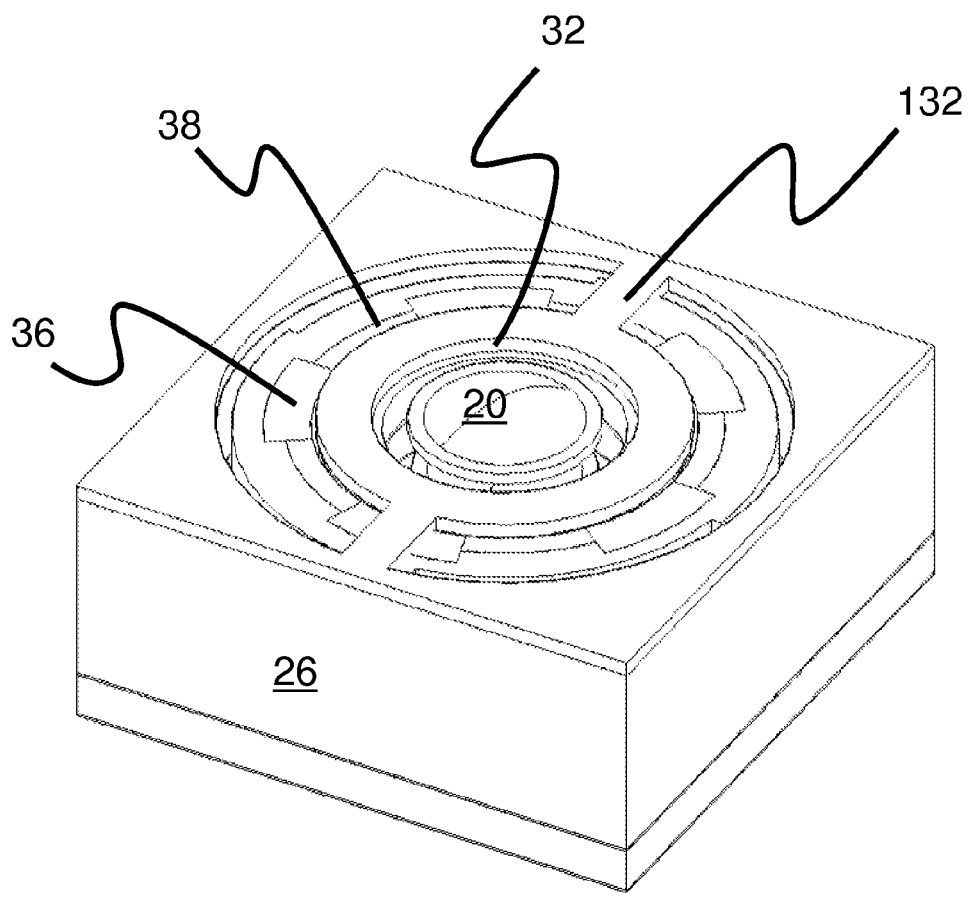
FIG. 8 shows the support in more detail.

FIG. 8 shows the support in more detail. Support 26 is fixed to the outer casing of compact camera module 100 (FIG. 2) or forms part of the outer casing. Thicker magnet segments 36 and thinner magnet segments 38 form a ring that is rotating shared magnet 40 that rotates within support 26. Upper stationary coil 32 is attached to support 26 by support members 132. Second lens group 20 fits in an opening in the center of upper stationary coil 32, but is not attached to upper stationary coil 32. Instead, second lens group 20 is free to move up along the optical axis as the rotating shared magnet rotates rotating guide 30 (not shown). Rotating guide 30 is attached to the top of the rotating shared magnet (36, 38).

Figure 9:
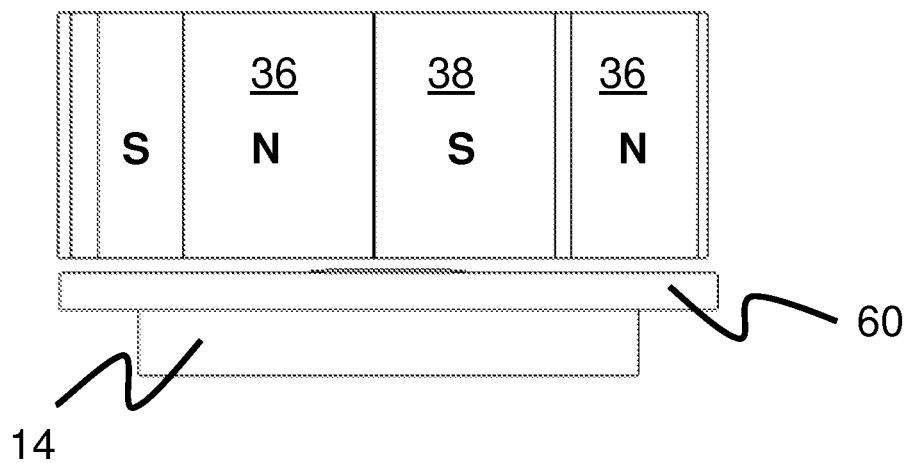
FIG. 9 shows the autofocus actuator sharing the rotating shared magnet with the zoom function.

FIG. 9 shows the autofocus actuator sharing the rotating shared magnet with the zoom function. The zoom operation is normally performed first, before autofocus is performed. Once first lens group 10 and second lens group 20 have been moved by rotating guide 30 to the proper position for the desired zoom factor (FIG. 1), then third lens group 14 is moved to focus the image on image sensor 19. The movement of third lens group 14 is known as autofocus.

Once the zoom factor has placed first lens group 10 and second lens group 20 in the desired position, rotating shared magnet 40 is not rotated further. However, rotating shared magnet 40 can be used for autofocus without rotating further. The upper stationary coil 32 and lower stationary coil 34 are turned off. A third coil is used for autofocus, autofocus coil 60.

While upper stationary coil 32 and lower stationary coil 34 are located inside and on a same level as rotating shared magnet 40, autofocus coil 60 is located below rotating shared magnet 40. Since autofocus coil 60 is concentric and below rotating shared magnet 40, autofocus coil 60 does not cause rotating shared magnet 40 to rotate.

Since rotating shared magnet 40 has both thicker magnet segments 36 (polarized north) and thinner magnet segments 38 (polarized south), an unequal magnetic force is produced. The north magnetic force dominates the south force when autofocus coil 60 is activated. Thus rotating shared magnet 40 acts as a net north magnet with respect to autofocus coil 60, which is below, rather than around, rotating shared magnet 40.

Electric current is passed through the windings of autofocus coil 60 to energize it. Autofocus coil 60 located below rotating shared magnet 40 is attached to third lens group 14. Both autofocus coil 60 and third lens group 14 move up and down during autofocusing. Autofocus coil 60 acts as a third magnetic field generator that interacts with the rotating shared magnet to induce an electromagnetic force to move third lens group 14 along the optical axis, rather than to rotate the rotating shared magnet.

Figure 10:
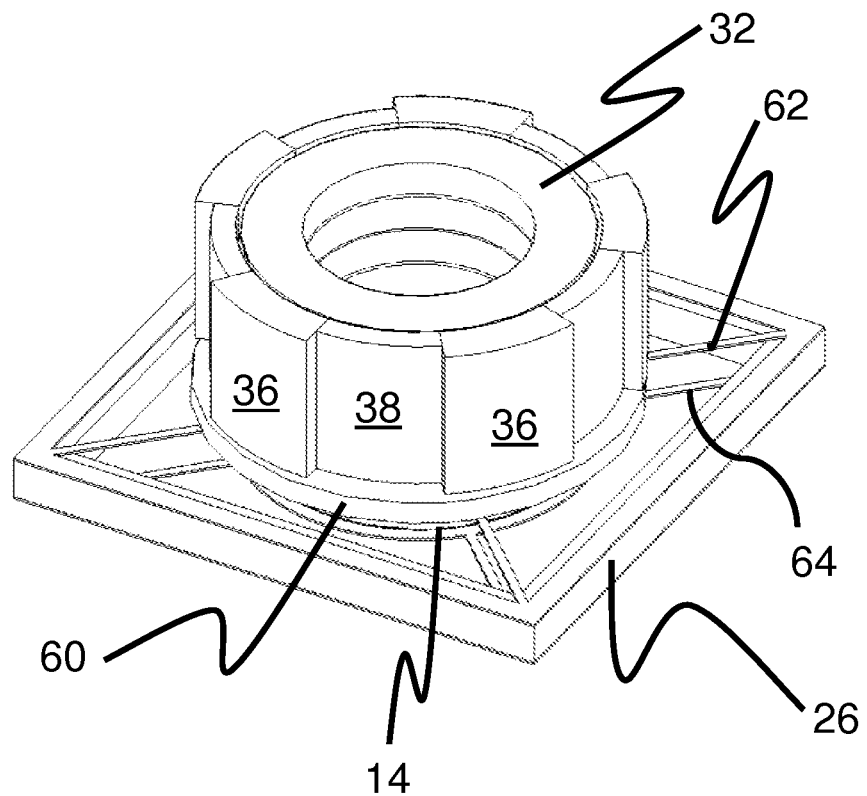
FIG. 10 shows in more detail the autofocus actuator sharing the rotating shared magnet.

FIG. 10 shows in more detail the autofocus actuator sharing the rotating shared magnet. The autofocus actuator includes both rotating shared magnet 40 and autofocus coil 60. Together they operate like a Voice Coil Motor (VCM). Upper stationary coil 32 and lower stationary coil 34 (hidden) are turned off during auto focusing.

The north magnetic fields of thicker magnet segments 36 dominate the south magnetic fields of thinner magnet segments 38 when autofocus coil 60 is energized. Autofocus coil 60 is pushed downward, away from rotating shared magnet 40, when autofocus coil 60 is energized to react with the magnetic fields of thicker magnet segments 36 to creating a repulsive force. Third lens group 14 is also pulled downward for a better focus.

Autofocus coil 60 is pulled upward, closer to rotating shared magnet 40, when autofocus coil 60 is energized to create an attractive force. Third lens group 14 is also pulled upward along the optical axis for a better focus. In some embodiments, autofocus coil 60 may only be energized with an attractive or with a repulsive force, and is not capable of producing both forces at different times.

Springs 62, 64 attached between support 26 and third lens group 14 provide a restoring force when autofocus coil 60 is turned off. When the image is being captured, autofocus coil 60 remains energized to hold third lens group 14 in the focused position.

Figure 11:
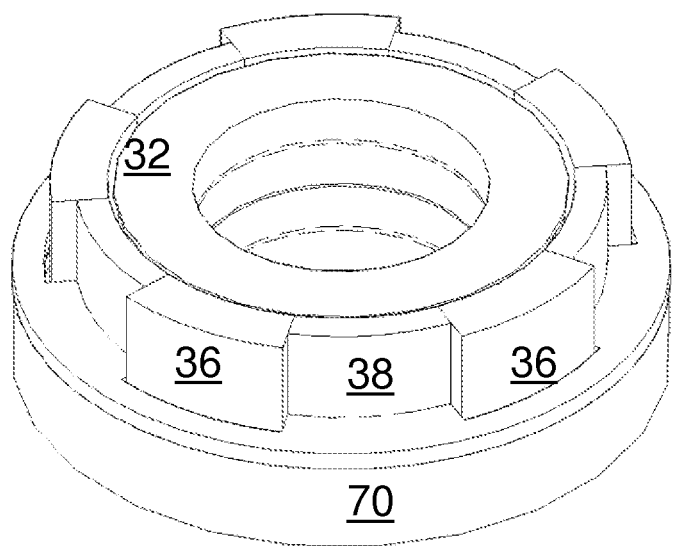
FIG. 11 show a ball bearing assembly around the rotating shared magnet.

FIG. 11 show a ball bearing assembly around the rotating shared magnet. When rotating shared magnet rotates, vibration and friction may occur. Ball bearing assembly 70 is placed around the perimeter of rotating shared magnet 40 to reduce vibration and friction.

Ball bearing assembly 70 has an outer casing 72 that attaches to support 26, and an inner cover 74 that fits over thicker magnet segments 36 and thinner magnet segments 38 of rotating shared magnet 40. Outer casing 72 rotates with respect to inner cover 74. Inside ball bearing assembly 70 are ball bearings that roll along outer casing 72 as rotating shared magnet 40 rotates.

Figure 12:
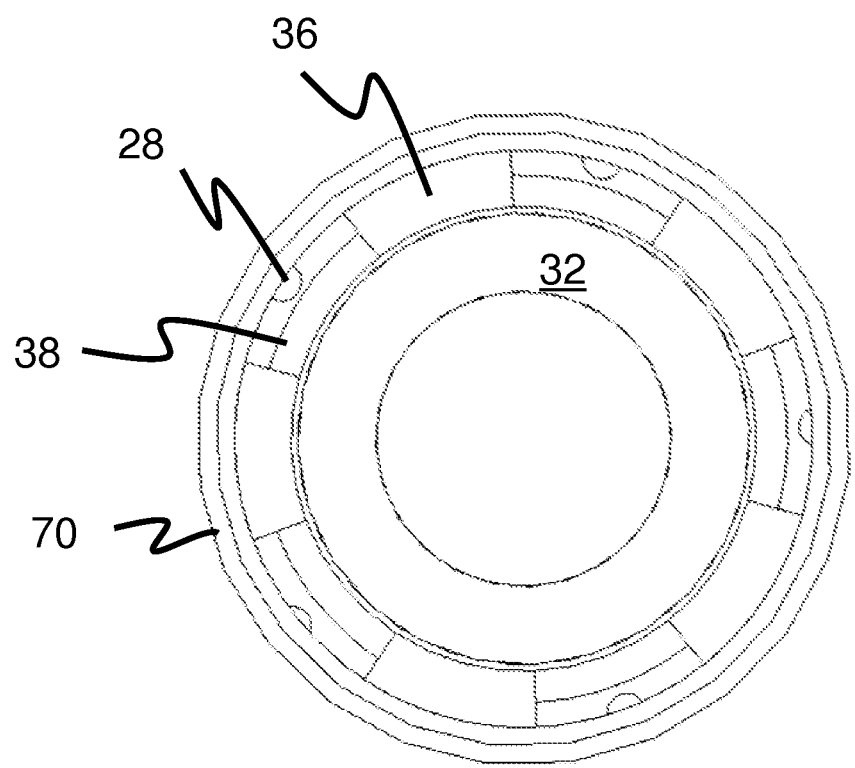
FIG. 12 highlights ball bearings that support the rotating shared magnet.

FIG. 12 highlights ball bearings that support the rotating shared magnet. Ball bearings 28 roll within ball bearing assembly 70, between outer casing 72 and the outer surface of rotating shared magnet 40. Ball bearings 28 fit in the grooves formed by thinner magnet segments 38 between thicker magnet segments 36. Ball bearings 28 are prevented from rolling over thicker magnet segments 36 because of the greater thickness of thicker magnet segments 36. The outer dimension of ball bearing assembly 70 is thus reduced, providing for a more compact design of the compact camera module.

Upper stationary coil 32 and outer casing 72 are fixed to support 26 and do not move or rotate, but rotating shared magnet 40 and ball bearings 28 rotate.

Figure 13:
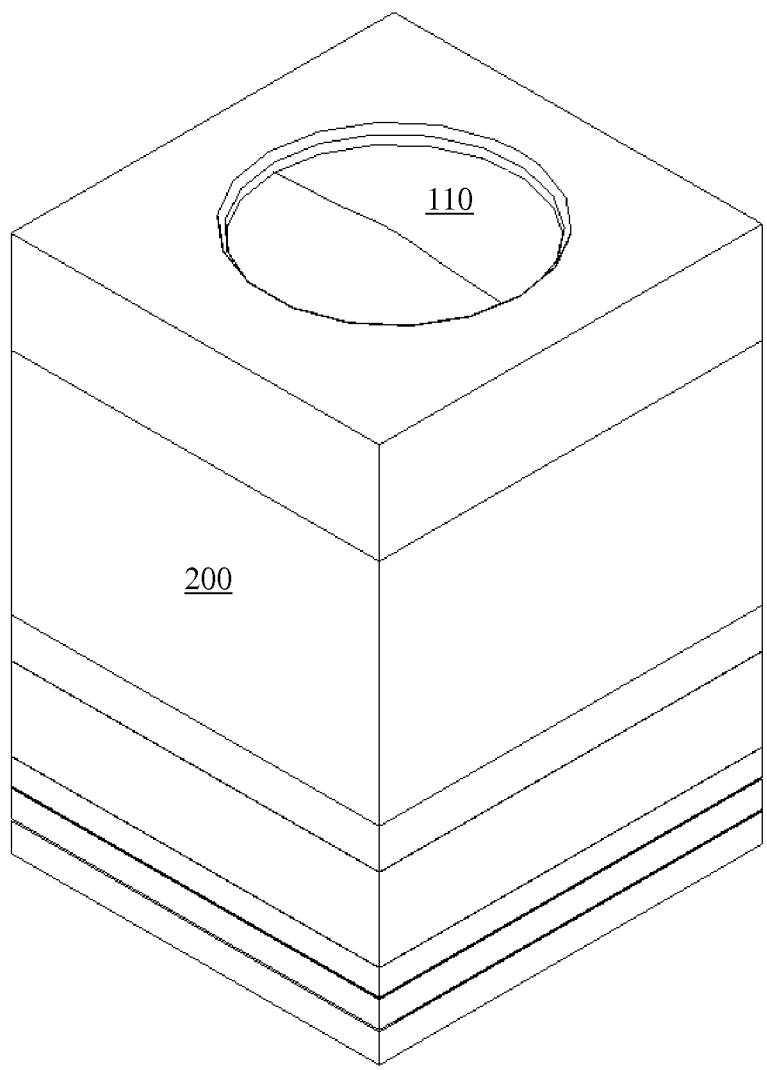
FIG. 13 is an external view of a compact camera module using gears.

FIGS. 13-17 show another embodiment of the invention using gears. FIG. 13 is an external view of a compact camera module using gears. Compact camera module 200 performs the 3× zoom function of FIG. 1 and also provides autofocus using a shared magnet. Only first lens group 110 is visible from the exterior of compact camera module 200. Compact camera module 200 can be assembled into a digital camera with first lens group 110 facing away from the digital camera, toward the object of the image, such as a person or a landscape.

Figure 14:
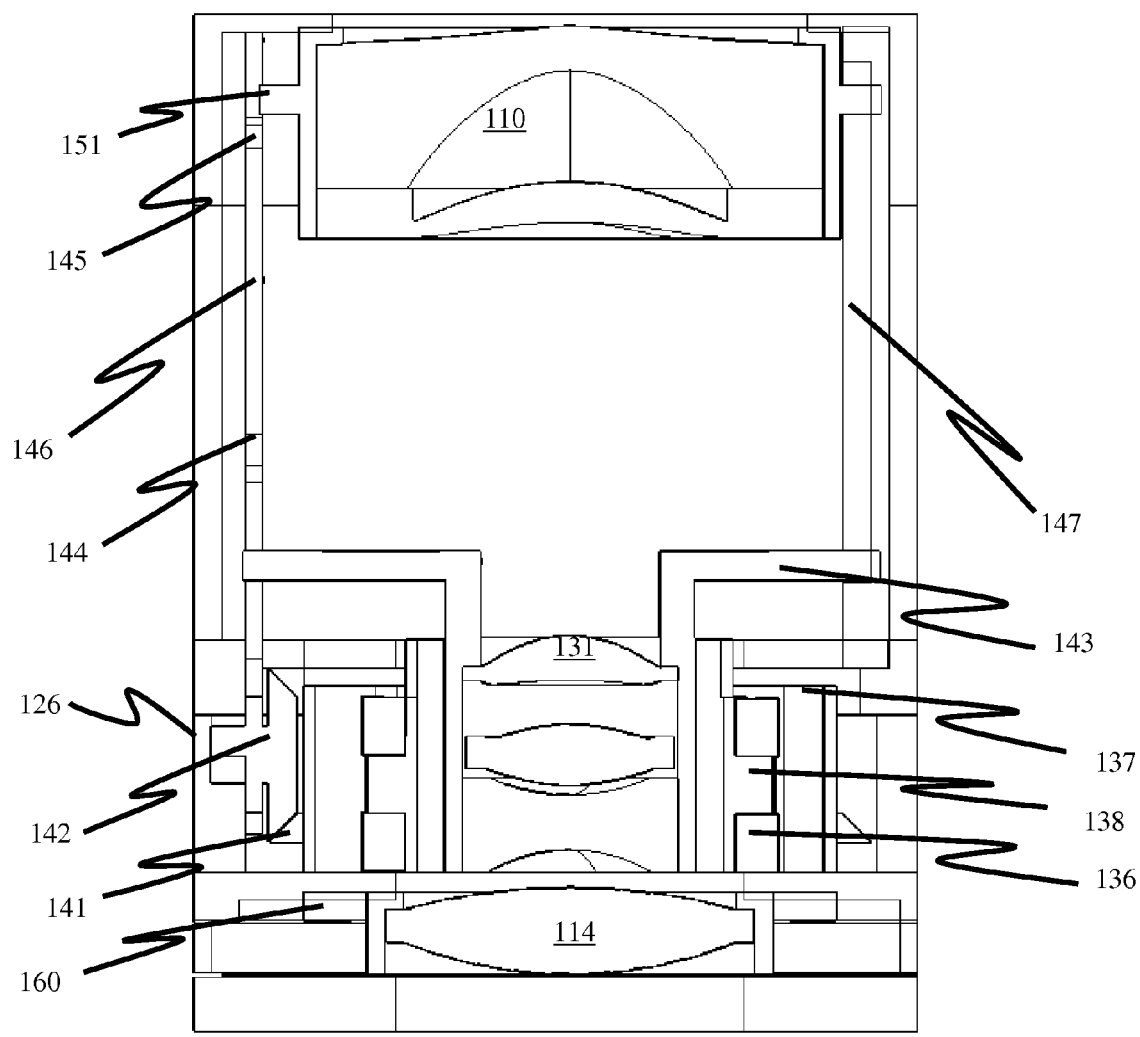
FIG. 14 is a cross-sectional view of the embodiment using gears.
Figure 15:
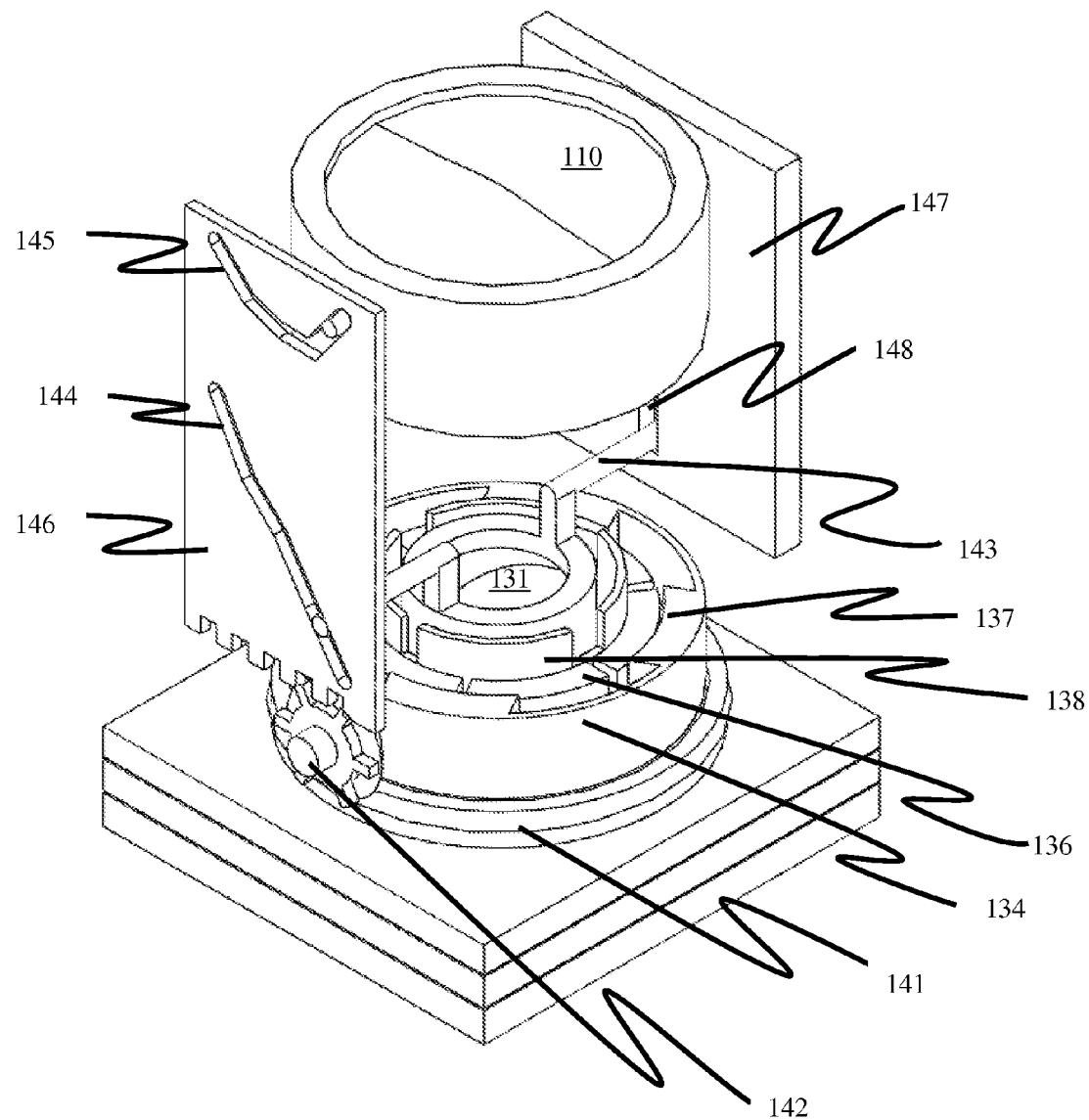
FIG. 15 is another view of the embodiment using gears.

FIG. 14 is a cross-sectional view of the embodiment using gears. FIG. 15 is another view of the embodiment using gears. Rather than use a rotating guide, moving guide 146 moves sideways (FIG. 15) due to gear 142. The second guide is stationary guide 147 that does not move, but is fixed to support 126. One guide is stationary while the other guide slides within a plane rather than rotates.

First lens group 110 is near the top (objective) end of the optical axis, which is a vertical line (not shown) running through the centers of first lens group 110, second lens group 131, and third lens group 114. For 1× zoom, second lens group 131 is fully retracted toward third lens group 114.

During the zoom function, as the zoom magnification changes, first lens group 110 moves down and up in response the movement of moving guide 146. Second lens group 131 also moves along the optical axis as moving guide 146 moves forward or backward. Moving guide 146 is generally a plate with two paths guiding first lens group 110 and second lens group 131.

Moving guide 146 is driven by second driving gear 142. Second driving gear 142 is coupled to first driving gear 141, which is coupled to rotating shared magnet 139. First driving gear 141 can have teeth (not shown) that engage second driving gear 142 as rotating shared magnet 139 rotates.

As rotating shared magnet 139 turns, first driving gear 141 is rotated and drives second driving gear 142. Second driving gear 142 drives moving guide 146 forward and backward, which drives first lens group 110 and second lens group 131 to move up and down along the optical axis. Rotating shared magnet 139 is part of a stepping motor. Rotating shared magnet 139 is shown in more detail in FIG. 16.

Rotating shared magnet 139 includes magnet segments 137 and magnet holder 134 that rotate out of the plane of the cross-sectional. Thick and thin magnet sections may be used as shown earlier in FIG. 6. The center of rotation is the optical axis through the centers of first lens group 110, second lens group 131, and third lens group 114.

Stationary coil 136 and rotating shared magnet 139 together form a stepping motor that rotates first driving gear 141. Stationary coil 136 can be constructed as described earlier for FIG. 5.

As rotating shared magnet 139 and first driving gear 141 rotate together, they drive second driving gear 142, and moving guide 146 is forced to move forward and backward as the teeth on the bottom of moving guide 146 engage teeth on second driving gear 142. Lower slot 144 in moving guide 146 receives one of second arms 143 that are attached to second lens group 131. As moving guide 146 moves forward, second arms 143 are forced upward by slots 144, 148, pulling second lens group 131 upward along the optical axis. The zoom magnification increases by moving second lens group 131 upward. Some movement up or down of first lens group 110 may have occurred in a similar manner using upper slot 145.

Second lens group 131 is not attached to stationary coil 136. Stationary coil 136 is fixed in position to a support (not shown). Rotating shared magnet 139 is not attached to stationary coil 136 and rotates freely around stationary coil 136.

Stationary guide 147 is fixed to support 126 and contains first groove 148 that fits over one of first arms 151 and one of second arms 143. First groove 148 can be a vertical slot that accepts both first arms 151 and second arms 143, or can be separate vertical slots or some other mechanism.

First arms 151 attached to first lens group 110 are forced to move up and down first groove 148 as moving guide 146 moves forward or backward, since the other one of first arms 151 fits into upper slot 145 in moving guide 146.

First lens group 110 is supported by one of first arms 148 that fit into upper slot 145 in moving guide 146 and by another of first arms 148 that fits into first groove 148 in stationary guide 147. Likewise, second lens group 131 also has arms 143 that fit into lower slot 144 in moving guide 146 and into first groove 148 in stationary guide 147. However, the shapes of upper slot 145 and lower slot 144 differ. Also, first groove 148 in stationary guide 147 is a vertical slot.

Upper slot 145 dips down and then back up the sides of moving guide 146, while lower slot 144 falls down the sides of moving guide 146 without rising back up. The lowest location of upper slot 145 on moving guide 146 corresponds to the minimum on path 12 of first lens group 110 shown in FIG. 1, which occurs near a 2× zoom. The shape of upper slot 145 causes first lens group 110 to trace path 12 as moving guide 146 moves, while the shape of lower slot 144 causes second lens group 131 to trace path 16 as moving guide 146 moves. The lens group movement of FIG. 1 is thus achieved.

Figure 16:
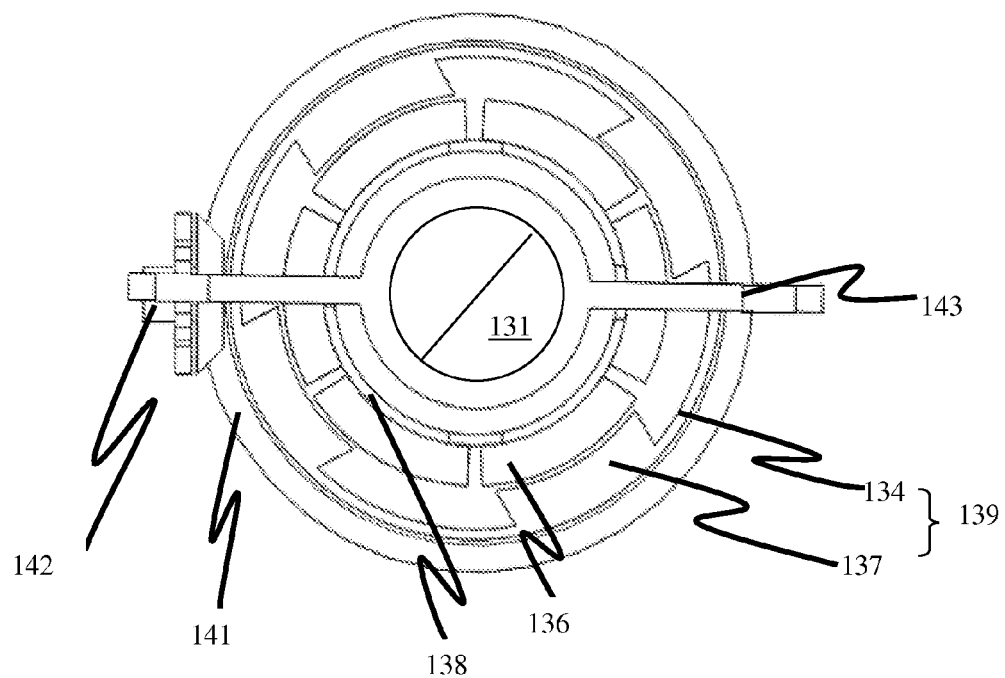
FIG. 16 is a top view of the gears, rotating shared magnet, and stationary coils for the geared embodiment.

FIG. 16 is a top view of the gears, rotating shared magnet, and stationary coils for the geared embodiment. First driving gear 141 is attached and fixed to rotating shared magnet 139 so that they both rotate together. Stationary coil 136 does not rotate, but is fixed to coil holder 138. Coil holder 138 is fixed to support 126 (FIG. 14) and holds stationary coil 136.

First driving gear 141 can have teeth (not shown) that engage second driving gear 142 as rotating shared magnet 139 and first driving gear 141 rotate in the plane of the figure. As rotating shared magnet 139 turns, first driving gear 141 is rotated and drives second driving gear 142 to move second lens group 131 up out of the plane of the figure to adjust the zoom magnification.

The zoom operation is normally performed first, before autofocus is performed. Once the zoom factor has placed first lens group 110 and second lens group 131 in the desired position, rotating shared magnet 139 is not rotated further.

However, rotating shared magnet 139 can be used for autofocus without rotating further. Stationary coil 136 is turned off. A third coil is used for autofocus, autofocus coil 160 (FIG. 17).

While stationary coil 136 is located inside and on a same level as rotating shared magnet 139, autofocus coil 160 (not visible in FIG. 16) is located below rotating shared magnet 139. Since autofocus coil 160 is concentric and below rotating shared magnet 139, autofocus coil 160 does not cause rotating shared magnet 139 to rotate.

Figure 17:
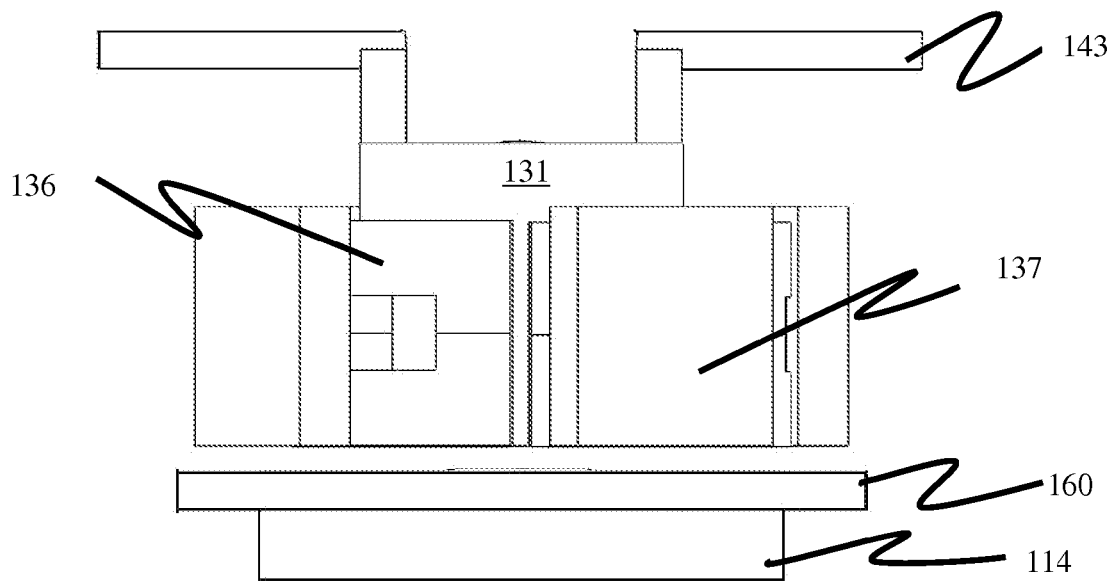
FIG. 17 shows in more detail the autofocus actuator sharing rotating shared magnet.

FIG. 17 shows in more detail the autofocus actuator sharing rotating shared magnet. The autofocus actuator includes both rotating shared magnet 139 and autofocus coil 160. Together they operate like a Voice Coil Motor (VCM). Stationary coil 136 is turned off during auto focusing.

Electric current is passed through the windings of autofocus coil 160 to energize it. Autofocus coil 160 located below rotating shared magnet 139 is attached to third lens group 114. Both autofocus coil 160 and third lens group 114 move up and down during autofocusing.

Autofocus coil 160 is pulled upward, closer to rotating shared magnet 139, when autofocus coil 160 is energized to create an attractive force. Third lens group 114 is also pulled upward along the optical axis for a better focus. In some embodiments, autofocus coil 160 may only be energized with an attractive or with a repulsive force, and is not capable of producing both forces at different times.

Alternate Embodiments

Several other embodiments are contemplated by the inventors. For example the number and sizes of lenses in each lens group may vary. The first lens group have two or more sub-lens groups and each of these lens groups could be moved in independent paths. The optical axis could be bent, such as by a minor or prism.

While a rotating guide transmission system and a gear and moving plate transmission system have been described in detail, other transmission systems could be used with the rotating shared magnet to transmit force to move the lens groups. Many different mechanical mechanisms, linkages, and variants could be substituted to transmit the force produced by the rotating shared magnet to the lens groups.

Rather than have the north polarity for thicker magnet segments 36, the south polarity could be used for thicker magnet segments 36 and the north polarity for thinner magnet segments 38. The shapes of components could be changed for a variety of reasons, such as the addition of flanges, keyed tabs, alignment aids, etc.

Other embodiments may have additional or fewer lenses in each group, or may even have an additional group or groups of lenses. A lens group can have a single lens. Some groups may be fixed while other groups move along the optical axis. By using rotating shared magnet 40 rather than separate magnets for the zoom actuator and for the autofocus actuator, interference may also be reduced as well as size.

Autofocus coil 60 could be a ring shaped coil that is situated directly under rotating shared magnet 40, or could have a smaller diameter than rotating shared magnet 40 and be located below the center hollow of rotating shared magnet 40. Other arrangements are possible. Support 26 may have many sub-parts that are connected together, and there may be an outer shell outside of support 26. The outer shell could also enclose rotating guide 30 but not be fixed to rotating guide 30.

While a digital camera lens module has been described, compact camera module 100 could be used for video cameras, still cameras, monitor cameras, or for other purposes. The lens module or a similar assembly could be used for photolithography equipment in manufacturing, such as for patterning semiconductor chips, or for projectors.

The compact camera module could be used with a variety of image sensors, both electronic and chemical. The zoom magnification does not have to vary continuously between 1× and 3×, but could have discrete steps or could cover a wider or a narrower range. The optical path could include an image splitter that directs light to both image sensor 19 and to another sensor, such as for exposure or white balance or range finding. Optical filters could be included with the lens groups or separately.

The stationary coils could surround the outside of rotating shared magnet 40 rather than be inside rotating shared magnet 40. Current could flow in a reverse direction in the coils to reverse magnetic effects. Alternating currents could be used in some cases. Various timings and controls of signals applied to the coils could be used, such as sine waves, square waves, rectangular waves, pulses that are overlapping or non-overlapping, etc. Directional terms are relative, with bottom generally referring to the end of the optical axis that intersects with the image sensor, and upper or above generally referring to distances along the optical axis that are farther from the image sensor and closer to the object. Annular or ring shapes can be doughnut shapes with a central hole or cavity and can have a circular perimeter or may be a many-sided polygon that approximates a circle.

In other embodiments the shared magnet (stationary shared magnetic field generator) can be stationary and coupled to the autofocus coil (the third magnetic field generator). The shared magnet also can be coupled to the rotating magnetic field generator. The rotating magnetic field generator may include the upper coil creating an upper magnetic field when current passes through upper windings in the upper coil. The upper coil can be centered on the optical axis of lens group. The upper magnetic field created by the upper coil forces the rotating magnetic field generator to rotate around the optical axis. The shared magnet and autofocus coil can induce an electromagnetic force to drive the autofocus coil causing the third lens group to move. The rotating shared magnet and stationary coils could reverse roles, with the shared magnet being fixed and the coils being allowed to rotate. The autofocus coil could sit below the shared magnet and move along the optical axis when energized. The rotating shared magnet and the stationary coils could swap locations, with the rotating shared magnet inside the stationary coils rather than outside the stationary coils. Autofocus could be in response to an automated input such as from an image processing computer that detects focus or from a manual input such as a user pressing a focus button.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A lens driving apparatus comprising:
   a rotating shared magnet that comprises:
      thicker magnet segments having a first magnetic polarity;
      thinner magnet segments having a second magnetic polarity;
      wherein the thicker magnet segments and the thinner magnet segments alternate around a circumference of the rotating shared magnet;
   a stationary coil coupled to the rotating shared magnet;
   an auto-focusing coil that is concentric with and above or below the rotating shared magnet;
   wherein the rotating shared magnet and the stationary coil induce a first electromagnetic force to rotate the rotating shared magnet, which drives at least a first lens group to move along an optical axis;
   wherein the thicker and thinner magnet segments in combination are adapted to produce an unequal magnetic force on the rotating shared magnet, causing the rotating shared magnet to further interact with the auto-focusing coil to induce a second electromagnetic force to enable the auto-focusing coil and a second lens group to move along the optical axis,
   wherein movement of the first lens group and movement of the second lens group vary a distance along the optical axis between the first lens group and the second lens group.

2. The lens driving apparatus of claim 1 further comprising:
   the first lens group movable along the optical axis;
   the second lens group movable along the optical axis;
   a support;
   wherein the rotating shared magnet rotates around the optical axis;
   wherein the stationary coil is fixedly attached to the support, the stationary coil situated around the optical axis; and
   a first linkage between the rotating shared magnet and the first lens group, the first linkage transferring the first electromagnetic force that rotates the rotating shared magnet to the first lens group, the first linkage causing the first lens group to move along the optical axis in response to rotation of the rotating shared magnet;
   wherein the auto-focusing coil is attached to the second lens group.

3. The lens driving apparatus of claim 2 further comprising:
   an intermediate lens group movable along the optical axis, the intermediate lens group situated between the first and second lens groups;
   a second linkage between the rotating shared magnet and the intermediate lens group, the second linkage transferring the first electromagnetic force that rotates the rotating shared magnet to the intermediate lens group, the second linkage causing the intermediate lens group to move along the optical axis in response to rotation of the rotating shared magnet.

4. The lens driving apparatus of claim 3 wherein the stationary coil comprises:
   an upper stationary coil fixedly attached to the support, the upper stationary coil creating an upper magnetic field when current passes through upper windings in the upper stationary coil, the upper stationary coil centered on the optical axis;
   wherein the upper magnetic field created by the upper stationary coil forces the rotating shared magnet to rotate around the optical axis.

5. The lens driving apparatus of claim 4 wherein the stationary coil further comprises:
   a lower stationary coil fixedly attached to the support, the lower stationary coil creating a lower magnetic field when current passes through lower windings in the lower stationary coil, the lower stationary coil centered on the optical axis;
   wherein the lower magnetic field created by the lower stationary coil forces the rotating shared magnet to rotate around the optical axis;
   wherein the upper stationary coil and the lower stationary coil are alternately energized to rotate the rotating shared magnet in a sequence of steps, the steps being less than a full rotation of the rotating shared magnet,
   wherein the rotating shared magnet and the upper stationary coil and the lower stationary coil form a step motor actuator that moves the first lens group along the optical axis.

6. The lens driving apparatus of claim 5 wherein the upper stationary coil further comprises:
   a first upper yoke having first upper teeth;
   a second upper yoke having second upper teeth;
   wherein the first and second upper teeth alternate along a circumference of the upper stationary coil between the upper windings of the upper stationary coil and the rotating shared magnet;
   wherein the first upper teeth have the first magnetic polarity when the upper stationary coil is energized;
   wherein the second upper teeth have the second magnetic polarity when the upper stationary coil is energized;
   wherein the lower stationary coil further comprises:
   a first lower yoke having first lower teeth;
   a second lower yoke having second lower teeth;
   wherein the first and second lower teeth alternate along a circumference of the lower stationary coil between the lower windings of the lower stationary coil and the rotating shared magnet;
   wherein the first lower teeth have the first magnetic polarity when the lower stationary coil is energized;
   wherein the second lower teeth have the second magnetic polarity when the lower stationary coil is energized.

7. The lens driving apparatus of claim 3 wherein the auto-focusing coil is attached to the second lens group, wherein when current is passed through the auto-focusing coil the second electromagnetic magnetic force is created between the auto-focusing coil and the rotating shared magnet, the second electromagnetic force causing the auto-focusing coil and the second lens group to move along the optical axis to focus an image from light passing through the first lens group and the second lens group onto an image sensor,
wherein the rotating shared magnet is shared for actuating lens movement for zoom and autofocus functions.

8. The lens driving apparatus of claim 3 wherein the first linkage comprises:
a first driving gear coupled to the rotating shared magnet;
a second driving gear coupled to engage the first driving gear;
a moving guide coupled to the second driving gear;
wherein the moving guide moves in response to rotation of the rotating shared magnet.

9. The lens driving apparatus of claim 3 wherein the first linkage comprises:
a rotating guide that rotates around the optical axis;
wherein the rotating shared magnet rotates around the optical axis and is attached to rotate the rotating guide when the rotating shared magnet is rotated.

10. The lens driving apparatus of claim 9 wherein the first linkage comprises a first arm attached to the first lens group and a first slot in the rotating guide that receives the first arm, wherein rotation of the rotating guide causes the first arm to slide along the first slot;
wherein the second linkage comprises a second arm attached to the intermediate lens group and a second slot in the rotating guide that receives the second arm, wherein rotation of the rotating guide causes the second arm to slide along the second slot.

11. The lens driving apparatus of claim 10 wherein the first linkage further comprises:
a first guide that is fixed to the support;
a first groove formed in the first guide, the first groove receiving the first arm that passes through the first slot;
wherein the first lens group is moved along the optical axis by rotation of the rotating guide that forces the first arm in the first slot to move along the first groove.

12. The lens driving apparatus of claim 2 further comprising:
a spring connected between the second lens group and the support, wherein the spring restores the second lens group to a default position.

13. The lens driving apparatus of claim 1 further comprising:
a ball bearing assembly having ball bearings that roll along a circumference of the rotating shared magnet when the rotating shared magnet rotates, the ball bearing assembly having a portion attached to the support.

14. The lens driving apparatus of claim 13 wherein the thinner magnet segments form pockets between a pair of the thicker magnet segments;
wherein the ball bearings roll in the pockets along the thinner magnet segments but do not roll along the thicker magnet segments outside of the pockets,
whereby the ball bearings roll in the pockets bounded by the thicker magnet segments.

15. The lens driving apparatus of claim 5 wherein the upper stationary coil and the lower stationary coil are annular coils surrounding a central cavity;
wherein the intermediate lens group fits into the central cavity when in a first zoom position, but is outside the central cavity when in a second zoom position.

16. The lens driving apparatus of claim 1 wherein the rotating shared magnet is an annular shaped magnet that surrounds the stationary coil,
wherein the rotating shared magnet rotates around and outside of the stationary coil;
wherein the auto-focusing coil is located below the rotating shared magnet.

17. A lens module comprising:
first lens group means for collecting light from an object;
second lens group means for bending light from the first lens group means along an optical axis;
third lens group means for focusing light from the second lens group means onto an image sensor;
support means for supporting components of the lens module;
rotating shared magnet means for rotating around the optical axis;
a stationary coil fixedly attached to the support, the stationary coil concentrically situated around the optical axis;
wherein the rotating shared magnet means further comprises:
thicker magnet segments having a first magnetic polarity;
thinner magnet segments having a second magnetic polarity;
wherein the thicker magnet segments and the thinner magnet segments alternate around a circumference of the rotating shared magnet means;
wherein magnetic forces from alternating the thicker and thinner magnetic segments induce a first electromagnetic force to rotate the rotating shared magnet means around the optical axis;
first linkage means, between the rotating shared magnet means and the first lens group means, the first linkage means for transferring the first electromagnetic force that rotates the rotating shared magnet means to the first lens group means, the first linkage means causing the first lens group means to move along the optical axis in response to rotation of the rotating shared magnet means;
second linkage means, between the rotating shared magnet means and the second lens group means, the second linkage means for transferring the first electromagnetic force that rotates the rotating shared magnet means to the second lens group means, the second linkage means causing the second lens group means to move along the optical axis in response to rotation of the rotating shared magnet means; and
a auto-focusing coil attached to the third lens group means;
wherein the auto-focusing coil and the thicker and thinner magnetic segments on the rotating shared magnet induce a second electromagnetic force to move the third lens group means along the optical axis;
wherein the rotating shared magnet means induces the first electromagnetic force with the stationary coil to move the first lens group means and induces the second electromagnetic force with the auto-focusing coil to move the third lens group means,
whereby the rotating shared magnet means is shared by the stationary coil and the auto-focusing coil.

18. The lens module of claim 17 wherein the first linkage means further comprises:
a first driving gear coupled to the rotating shared magnet means;
a second driving gear coupled to engage the first driving gear;
a moving guide coupled to the second driving gear;

wherein the moving guide moves in response to rotation of the rotating shared magnet means.

19. The lens module of claim 17 wherein the first linkage means further comprises:
a rotating guide that rotates around the optical axis;
wherein the rotating shared magnet means further comprises:
a rotating shared magnet that rotates around the optical axis and is attached to rotate the rotating guide when the rotating shared magnet is rotated.

* * * * *